United States Patent [19]

Matsui et al.

[11] 3,879,759

[45] Apr. 22, 1975

[54] MAGNETIC TAPE HEAD INDEXING MECHANISM WITH SINGLE ARMATURE SPRING

[75] Inventors: Seiji Matsui; Yasukatsu Fujinaka; Yoshiaki Yabuno, all of Osaka, Japan

[73] Assignee: Matsushita Electric Industrial Co., Ltd., Kadoma-shi, Osaka-fu, Japan

[22] Filed: May 14, 1973

[21] Appl. No.: 360,062

[30] Foreign Application Priority Data

May 15, 1972 Japan ............................... 47-57162

[52] U.S. Cl. .................................. 360/106; 360/78

[51] Int. Cl. ............................................ G11b 5/56

[58] Field of Search ............................... 360/106, 78

[56] References Cited

UNITED STATES PATENTS 3,450,409 6/1969 Pitzer ................................. 360/106

3,820,160 6/1974 Huber ................................ 360/106

*Primary Examiner*—Stuart N. Hecker

*Attorney, Agent, or Firm*—Wenderoth, Lind & Ponack

[57] ABSTRACT

A magnetic tape head indexing mechanism for use in a cartridge-type tape player, which is intended for positioning a sound recording and reproducing head, that is, a magnetic tape head, to the different tracks of the tape. The mechanism operates so as to enable first and second pawl members to be engaged with the ratchet wheel by a spring pressure and permit them to hold the ratchet wheel between themselves by the spring pressure, thus excluding the possibility of unnecessary ratchet wheel rotation and permitting steady indexing operation of the magnetic tape head. Positioning of the magnetic tape head to the different tracks of the tape is achieved by stepwise rotation of the ratchet wheel.

3 Claims, 6 Drawing Figures

MAGNETIC TAPE HEAD INDEXING MECHANISM WITH SINGLE ARMATURE SPRING

The present invention relates generally to a magnetic tape head indexing mechanism and, more particularly, to such a mechanism for use in a cartridge-type tape player for positioning the magnetic tape head to the different tracks of the tape to be recorded or reproduced.

Figure 1:
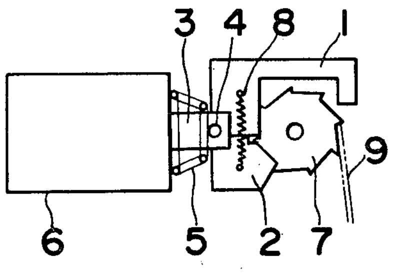
FIG. 1 Prior Art
Figure 2:
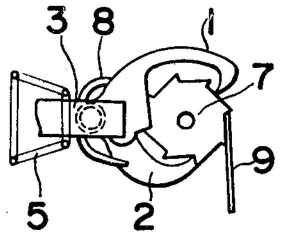
FIG. 2 Prior Art

In many conventional devices of a similar kind, as shown in FIGS. 1 and 2, the first and second pawl members 1 and 2 are pivotally coupled to the plunger 3 by the shaft 4, and the compression spring 5 is so disposed as to cover one end portion of said plunger 3 exposed outside the solenoid unit 6, thus necessitating the arrangement of a tension spring 8 for biasing said pawls 1 and 2 together while the ratchet wheel 7 is steadily held therebetween. It is the function of said compression spring 5 to permit said pawls 1 and 2 in engagement with said ratchet wheel 7 to return to the rest position when the solenoid is disenergized with the plunger 3 outwardly extended. Some conventional devices of a similar kind required a nail member 9 to secure a stepwise rotation of said ratchet wheel in one predetermined direction in cooperation with the members 1 and 2 urged by said compression spring 5 to each other. Another problem inherent in these conventional devices lies in the difficulty in adjusting the resiliencies of said springs 5 and 8 and the attracting power of the solenoid unit 6 in such a manner as to afford a smooth operation of said respective components.

According, it is an essential object of the present invention to provide an improved magnetic tape head indexing mechanism for use in a cartridge-type tape player that comprises relatively few parts and can be manufactured at a lower cost than that of conventional devices of a similar kind with substantial elimination of the above mentioned disadvantages and inconveniences inherent in the conventional players of a similar kind.

Another object of the present invention is to provide an improved magnetic tape head indexing mechanism for use in a cartridge-type tape player that can dispense with the tension spring and nail member referred to previously such as used in the conventional devices of a similar kind.

A further object of the present invention is to provide an improved magnetic tape head indexing mechanism for use in a cartridge-type tape player that advantageously ensures a smooth operation of the respective components.

In accordance with a preferred embodiment of the present invention, the magnetic tape head indexing mechanism essentially comprises a compression spring mounted on an end portion of the plunger exposed outside the solenoid unit, a first pawl member pivotally coupled to the plunger and having a finger and a locking portion so designed as to hold the ratchet wheel in a rest position in cooperation with the finger, and a second pawl member having a nail portion and an actuating portion, the nail portion and the actuating portion cooperating with respect to each other for effectuating each stepwise rotation of the ratchet wheel.

The pawl members are pivoted about the common pivot on the plunger to permit the finger of the first pawl member and the nail portion of the second pawl member to clamp the ratchet wheel from both sides thereof when the plunger is outwardly extended. When the plunger is inwardly extracted and subsequently outwardly extended, the actuating portion of the second pawl member pushes the ratchet wheel, rotating the latter in one direction and, subsequently, the nail portion of the second pawl member pushes the ratchet wheel, rotating the latter in the same direction, thus completing one stepwise rotation of said ratchet wheel. During this period, the finger portion of the first pawl member is in engagement with the ratchet wheel for counteracting the force applied to the ratchet wheel through the second pawl member.

Furthermore, no additional spring element is required as required in the conventional devices. This is because the compression spring mounted on the plunger acts to apply an axially acting force to the first and second pawl members so that said first and second pawl members are biased toward one another.

Figure 3:
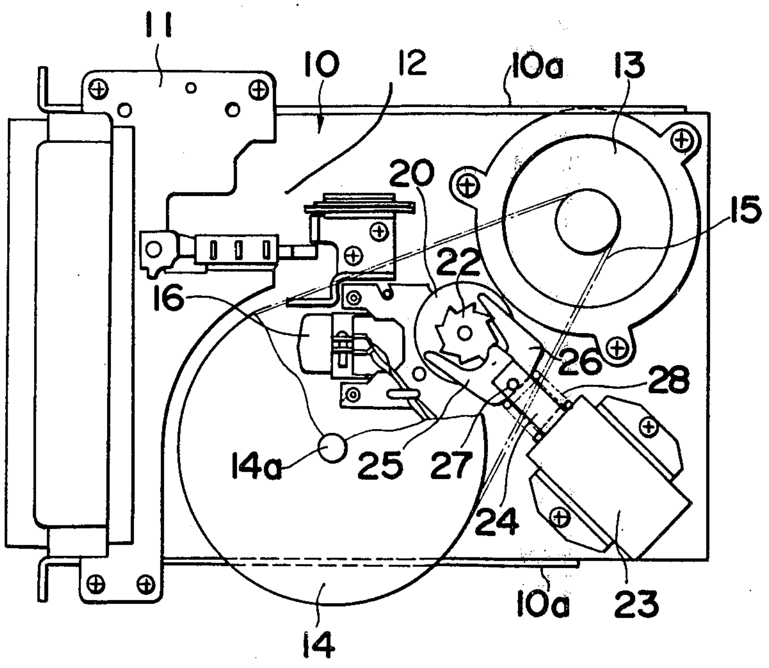
Figure 4:
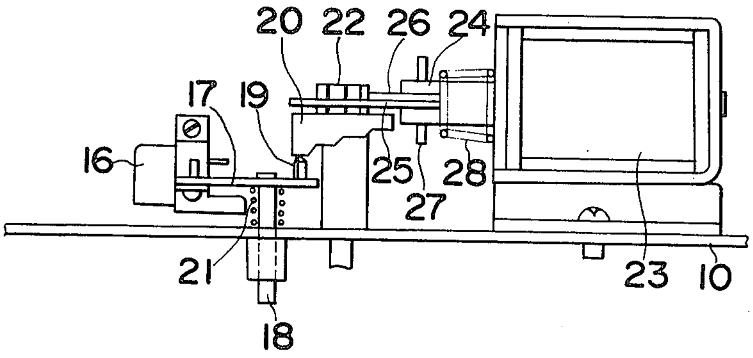
Figure 5:
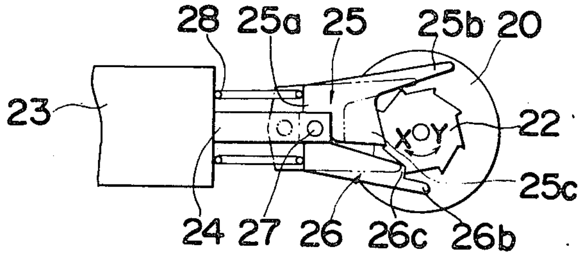
Figure 6:
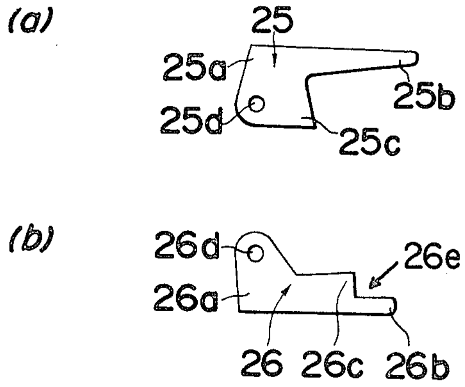

These and other objects and features of the present invention will become apparent from the following description taken in conjunction with a preferred embodiment thereof, in which;

FIG. 1 is a top plan view of a magnetic head indexing mechanism employed in the cartridge-type tape player of conventional type, FIG. 2 is a top plan view of another magnetic head indexing mechanism employed in the cartridge-type tape player of conventional type, FIg. 3 is a top plan view of the cartridge-type tape player embodying the present invention, FIG. 4 is a side elevational view of the pawl and ratchet mechanism in accordance with the present invention, FIG. 5 is a top plan view illustrating the operation of the pawl and ratchet mechanism according to the present invention, and FIG. 6 is a top plan view of the pawl members employed in the present invention.

Referring now to the figures of the accompanying drawings, particularly as shown in FIGS. 3 and 4, the cartridge-type tape player comprises a chassis 10 of substantially channel-shaped cross section having a pair of side walls 10*a*. A bridging plate 11 is secured to the chassis 10 at one end thereof so as to bridge over the chassis 10 between said side walls 10*a*, thereby defining a tape cartridge receiving chamber 12 in cooperation with said chassis. The chassis 10 is mounted with a motor 13 and a flywheel 14 driven by said motor 13 by means of an endless belt 15 suspended therebetween. The flywheel 14 has a shaft 14*a* rotatable together with said flywheel 14 and serving as a capstan for driving the multi-track tape within the tape cartridge (not shown) that is inserted in the chamber 12.

For sound reproduction or recording, a magnetic head unit is employed, as indicated by 16, which is supported by the chassis 10 and is shiftable in the direction at right angles to the path of travel of the multi-track tape driven by the motor 13 by means of the capstan 14*a*. As clearly shown in FIG. 4, the head unit 16 is supported by an arm member 17 having one end connected therewith and a portion adjacent to the other end thereof connected with a spindle 18 slidably extending through the chassis 10. The other end of said arm member 17 is rigidly provided with a pin member or a cam follower 19 which is engageable with a cam wheel 20 having a plurality of different cam surfaces each of which is associated with different tracks on the magnetic tape. A compression spring 21 is mounted on the spindle 18 between the arm member 17 and the chassis 10 for biasing said arm members 17 away from the chassis 10 with the cam follower 19 in constant engagement with the cam wheel 20. By rotating the cam wheel 20, the magnetic head unit 16 moves against the compression spring 21 to a position in alignment with a different set of tracks on the tape.

The arrangement of the cartridge-type tape player so far described is well known to those skilled in the art and, therefore, the details thereof are herein omitted for the sake of brevity. It is, however, to be noted that the indexing mechanism herein referred to is a device for rotating the cam wheel 20 so that the magnetic head unit 16 is selectively aligned with a different set of tracks on the tape.

The indexing mechanism constructed in accordance with the teachings of the present invention comprises a ratchet wheel 22 coaxial with the cam wheel 20. This ratchet wheel 22 may be, either separately or integrally, formed with the cam wheel 20. Disposed adjacent to the ratched wheel 22 is a solenoid unit 23 mounted on the chassis 10 and having a solenoid armature 24 selectively movable between extended and retracted positions in response to respective deenergization and energization of the solenoid unit 23. A free end of the solenoid armature 24 situated outside the solenoid unit 23 carries a pair of pawl plates 25 and 26, both pivotally connected to that free end of the solenoid armature 24 by means of a pin member 27 extending across the solenoid armature 24.

A compression spring 28 is mounted on the solenoid armature 24 between the solenoid unit 23 and a set of portions 25*a* and 26*a* of the respective pawl plates 25 and 26, whereby the solenoid armature 24 is normally biased to the extended position.

For transforming linear motion of the solenoid armature 24 into rotary motion of the cam wheel 20 coaxial with the ratchet wheel 22, each of the pawl plates 25 and 26 is constructed as shown in FIGS. 5 and 6.

Referring now to FIGS. 5 and 6, the pawl plate 25 is integrally formed with a finger 25*b* and a locking portion 25*c* substantially protruding towards the pawl plate 26. This pawl plate 25 is substantially in the form of an L, having one end serving the finger 25*b* and the other end formed with a pivot hole 25*d* through which the pin member 27 extends.

On the other hand, the pawl plate 26 is integrally formed, as at 26*b* and 26*c*, with a nail portion and an actuating portion, respectively, and similarly is substantially in the form of an L, having one end serving as the nail portion 26*b* and the other end formed with a pivot hole 26*d* through which the pin member 27 extends. The actuating portion 26*c* is located at a substantially intermediate portion of that end formed with the nail portion 26*d*.

These pawl plates 25 and 26 are biased towards each other about the pin member 27 by the action of the compression spring 28 which, while one end thereof is engaged against the solenoid unit 23, exerts through the other end thereof an outwardly acting, pushing force on that portions 25*a* and 26*a* of the respective plates 25 and 26. It is to be noted that the value of the pushing force exerted by the compression spring 28 on the pawl plates 25 and 26 varies as the compression spring 28 compresses which takes place when the solenoid armature 24 moves to the retracted position upon energization of the solenoid unit 23. Particularly, the present invention takes advantage of this variable pushing force for facilitating a smooth stepwise rotation of the ratchet wheel 22 and hence the cam wheel 20 thereby bringing the cam follower 19 into contact with the different cam surfaces of the cam wheel 20 to position the magnetic head unit 16.

While the indexing mechanism according to the present invention is constructed as hereinbefore described, it operates in the following manner. It is to be noted that, from the following description in connection with the operation of the indexing mechanism according to the present invention, the advantage of the variable pushing force exerted by the compression spring 28 on the pawl plates 25 and 26 will become clear.

The condition illustrated by the real line in FIG. 5 shows that the solenoid unit is not energized, with the solenoid armature 24 in the extended position. In this condition, the pushing force exerted by the compression spring 28 is of a relatively small value, i.e., smaller than when said solenoid armature 24 is in the retracted position. However, the cam wheel 20 is locked in position without arbitrarily and unnecessarily rotating about the axis of rotation thereof. This is partly because the ratchet wheel 22 tends to rotate in one direction as indicated by X by the pushing force of the compression spring 28, which is transmitted thereto through the portion 25*a* by means of the finger 25*b* then contacting the tooth tip of said ratchet wheel 22, and partly because, while the pawl plate 25 is conditioned such as hereinbefore described, the actuating portion 26*c* of the pawl plate 26 is biased about the pin member 27 by the pushing force of the compression spring 28 transmitted thereto through the portion 26*a* and engaged in one tooth groove of the ratchet wheel 22, thus counter acting against the force transmitted to the ratchet wheel 22 through the finger 25*b* of the pawl plate 25 thereby preventing the ratchet wheel 22 from rotating in the direction X.

As the solenoid armature 24 moves towards the retracted position upon energization of the solenoid unit 23, the actuating portion 26*c* slides along and in contact with one groove face of the ratchet wheel 22 which substantially faces in the direction Y, opposite to the direction X. Simultaneously therewith, the finger 25*b* of the pawl plate 25 slides in contact with the tooth tip of the ratchet wheel 22. Even during this movement of the solenoid armature 24 towards the retracted position, no arbitrary and unnecessary rotation of the cam wheel 20 take place since the two forces acting on the ratchet wheel 22 from both sides thereof, transmitted through the respective pawl plates 25 and 26, are still balanced while the compression spring 28 accumulates energy.

At the time retraction of the solenoid armature 24 is completed, the condition of which is illustrated by the chain line in FIG. 5, the nail portion 26*b* of the pawl plate 26 becomes engaged in the tooth groove of the ratchet wheel 22 that had been engaged by the actuating portion 26*c* when the solenoid armature 24 has been in the extended position, while the actuating portion 26*c* is conditioned ready to engage in the tooth groove next to the tooth groove now engaged by the nail portion 26*b* with respect to the direction Y of rotation of the wheel 22. During this condition, the pawl plate 25 is conditioned such that the finger 25*b* is still in contact with the tooth tip of the ratchet wheel 22.

Upon subsequent deenergization of the solenoid unit 23, the solenoid armature 24 commences to move towards the extended position from the retracted position. As the solenoid armature 24 moves in the direction towards the extended position, the nail portion **26*b* of the pawl plate 26 pushes the tooth of the ratchet wheel 22 causing the latter to rotate in the direction Y and, at the time the tooth next to the tooth pushed by the nail portion 26*b* falls in a step, formed in the pawl member 26 as at 26*e* between the nail portion 26*b* and the actuating portion 26*c*. The role of the nail portion 26*b* is then transferred to the actuating portion 26*c*, thereby permitting the ratchet wheel 22 to be further rotated by said actuating portion 26*c* in the same direction Y, thus completing one stepwise rotation of said ratched wheel 22 and hence the cam wheel 20**.

On the other hand, the pawl plate 25 is, during this time, conditioned such as to transmit the force of the compression spring 28 to the ratchet wheel 22 through the finger **25*b*, thus performing a braking action against an unnecessary rotation of said ratchet wheel 22**.

From the foregoing description, it has now become clear that, in contrast with the prior art, in the indexing mechanism according to the present invention, no additional spring element other than the compression spring 28 is required for, independent of the compression spring for biasing the solenoid armature to the extended position, biasing the pawl plates towards each other.

Although the present invention has been fully described by way of example, it is to be noted that, without departing from the true scope of the present invention, various changes and modifications are apparent to those skilled in the art and, therefore, such changes and modifications should be construed as included therein unless otherwise they depart therefrom.

What is claimed is:

1. A magnetic head indexing mechanism for use in a cartridge-type tape player adapted to receive and play tape cartridges having a multi-track tape therein and including a cam having a plurality of different cam surfaces, each one of which is associated with a different track on the tape and a cam follower in engagement with the cam for positioning the magnetic tape head, comprising a device for rotating the cam to position a different cam surface in contact with a cam follower with the playing of one of the different tracks on the tape, thereby automatically positioning the magnetic tape head to play a different track of the multi-track tape, said device including a solenoid unit having an armature movable between an extended position and a retracted position, only one spring element mounted on said armature, ratchet wheel coupled to the cam for rotation together with said cam, and first and second pawl members pivotally mounted on said armature in spaced relation with respect to each other with said ratchet wheel accommodated in the space between said first and second pawl members, said first and second pawl members being biased about the common pivot on the armature by said spring element in opposite directions towards each other, said first pawl member having a finger integrally formed therewith for sliding engagement with said ratchet wheel, thereby to prevent counter-rotation of said ratchet wheel, said second pawl member having a nail portion and an actuating portion both integrally formed therewith, and said first and second pawl members being in cooperative relation with respect to each other for rotating the ratchet wheel in one predetermined direction upon reciprocal movement of the armature.

2. An magnetic head indexing mechanism as claimed in claim 1, wherein said spring element comprises a compression spring having one end connected to a fixed portion and the other end in contact with said first and second pawl members for biasing the latter in the opposite direction toward each other about the common pivot.

3. An magnetic head indexing mechanism as claimed in claim 1, wherein said nail portion and said actuating portion of said second pawl member cooperate in such a manner that, during movement of said armature from the retracted position to the extended position, said actuating portion first pushes the ratchet wheel rotating the same in a first angular distance and said nail portion subsequently pushes the ratchet wheel rotating the same in a second angular distance, thereby completing one stepwise rotation of the ratchet wheel.

* * * * *